United States Patent

Leame

Patent Number: 5,709,251
Date of Patent: Jan. 20, 1998

[54] METHOD AND DEVICE FOR WINDING COILS FOR ELECTRIC MOTORS OR GENERATORS

[75] Inventor: Filippo Leame, Schoneck, Germany

[73] Assignee: STATOMAT Spezialmaschinen GmbH, Germany

[21] Appl. No.: 676,184

[22] PCT Filed: Jan. 11, 1995

[86] PCT No.: PCT/EP95/00092

§ 371 Date: Jul. 12, 1996

§ 102(e) Date: Jul. 12, 1996

[87] PCT Pub. No.: WO95/19655

PCT Pub. Date: Jul. 20, 1995

[30] Foreign Application Priority Data

Jan. 12, 1994 [DE] Germany .................. 44 00 610.1
Feb. 8, 1994 [DE] Germany .................. 44 03 919.0

[51] Int. Cl.$^6$ ............................................. B21F 3/00
[52] U.S. Cl. ............................................. 140/92.1
[58] Field of Search ................................... 140/92.1

[56] References Cited

U.S. PATENT DOCUMENTS 4,396,042  8/1983  Hamane et al. .............. 140/92.1
4,470,436  9/1984  Kubota et al. ............... 140/92.1

*Primary Examiner*—Lowell A. Larson
*Attorney, Agent, or Firm*—Larson and Taylor

[57] ABSTRACT

The device is used for winding coils for electric machines, in particular those with a large number of poles or with divided two-circuit turns. A rotating flyer (14) creates coil turns on a template, which are stripped off into a receiver (16). In order to obtain a minimally short inter-pole connection when winding connected coils, the template (12) is provided with at least one recess (36) on the circumference or with a separating gap (13), into which a holder (26), which holds the wire at the start of winding, can be introduced. In order to obtain end sections of a defined length on the coils, the wire (34) is clamped by the holder (26) between the flyer (14) and the template (12) and is then pulled out by means of a gripper (42) to a clamping and cutting device (44, 46).

14 Claims, 6 Drawing Sheets

METHOD AND DEVICE FOR WINDING COILS FOR ELECTRIC MOTORS OR GENERATORS

FIELD OF THE INVENTION

The invention relates to a method for winding coils made of conductor wire for electric motors or generators, particularly those with a large number of poles or with distributed wave winding or distributed loop winding, wherein a first coil or coil group is created on a template by means of a circulating wire guide, is stripped off the template into a receiver with circularly disposed slits and is moved on by a rotating movement of the receiver, whereupon, without a break in the wire, at least one further coil or coil group is created and stripped off into the receiver wherein, following the termination of the winding process of the first coil or coil group, the wire is grasped by a holder between the wire guide and the template, at the time of the start of the winding process of the further coil or coil group is clampingly held radially outside of the receiver at a point in the transition area between the sequentially wound coils or coil groups, and following the creation of the last continuously wound coil is cut off behind an end section projecting away from it for a defined length. The invention also relates to a device for executing such a method.

BACKGROUND OF THE INVENTION

Normally, a clamping and cutting device is attached to the machine frame at one side of the template, and a so-called length pulling device on the other side of the template of known winding devices. These are two different devices with different functions. The clamping and cutting device is only needed at the very end of a winding process, after winding of all continuously wound coil or coil groups is finished and the conductor wire must be cut. At the end of the winding process the clamping and cutting device moves into a 9rasping position for this purpose, wherein it receives the wire extending between the template and the wire guide, usually called a flyer, which has been stopped at a defined point in its path of rotation. The clamping and cutting device only needs to perform a simple movement which can be adjusted in such a way that the wire is cut at a defined distance from the template, i.e. so that it has a defined end length projecting away from the coil. Prior to the cutting process the wire is clamped between the cutting members and the flyer and is clampingly held until the start of winding of a fresh coil.

In contrast to this, the length pulling device is needed to temporarily grasp the wire in a transition area between respectively two coils or coil groups which are being continuously wound, i.e. without a break in the wire with a so-called inter-pole connection, to pull out a defined length of wire corresponding to the required length of the inter-pole connection and to clamp the wire at the start of winding. A length pulling device of this type has been described, for example, in German Patent Publication DE 30 24 219 A1. In connection with the known winding devices it is necessary to fasten the length pulling device on the machine frame either on the one side or the other side of the template, depending on the coils to be produced. Retooling and fresh adjustment is comparatively complicated and time-consuming. The clamping and cutting device must also be capable of being changed from the one side to the other side of the template in accordance with the different winding requirements.

In accordance with German Patent Publication DE 41 32 953 C1, a combined length pulling, clamping and cutting device has been developed to simplify retooling. It consists of a holder, which can be moved in a circle around the template and can grasp the wire which extends after a winding process from the flyer to the template at different points, and it can draw, while being guided on a defined path, a defined length of wire, measured from the template or the last wound coil, by grasping the wire only loosely, before the holder clamps the wire, possibly cuts it, and moves it to a predetermined location for starting the winding of the next coil.

The last mentioned known length pulling, clamping and cutting device has two decisive disadvantages. For one, it is not able to produce inter-pole connections of zero length or of a minimal length, such as are needed with motors or generators having so-called distributed wave winding or distributed loop winding as well as with other high-polar motors or generators, if it is intended to insert two coils, which had been wound sequentially without interruption, into the same stator groove or if they have only a very slight circumferential distance. In these cases, in all known length pulling devices too long an inter-pole connection results at the end turns projecting at the front out of the stator lamination bundles, which must be separately fastened and where wire damage can easily occur.

A further disadvantage of all known winding devices lies in that the length of wire required for the end section projecting from the last wound coil to the cutting point must be pulled by the clamping and cutting device as long as the wire is still stretched between the flyer and the template. If the wire had already been stripped off the template into the receiver, a relative movement between the clamping and cutting device loosely enclosing the wire and the flyer would pull wire back out of the last wound coil which now loosely hangs in the receiver.

A first object of the invention is to provide a winding device of the type mentioned at the outset which is able to generate minimally short inter-pole connections, even of zero length, so that in case of successively wound coils, which are inserted into a common stator or rotor groove, they are completely integrated into the end turns.

The above object is attained in accordance with the invention by a method wherein at the start of the winding process of the further coil or coil group the wire is essentially maintained clamped on the circumference of the template.

This condition could not be brought about with the known winding devices, because the holder of the length pulling device which clampingly holds the wire when winding is started has a definite spatial extent so that even if the holder were to be moved against the template, the clamping point of the wire would be outside the circumference of the template. A prerequisite for the proposed method is therefore the design in accordance with the invention of the template with at least one recess or separating gap into which the holder can be introduced from the outside far enough so that the wire can be clamped essentially on the circumference of the template.

For winding coil groups consisting of several concentric coils of different diameters, the templates have several stages or chambers. Since normally the lowest, smallest stage of the template is wound first and the coils on the increasingly larger stages disposed above it are created afterwards, it is sufficient if only the lowest, smallest template stage is provided with preferably two recesses located on opposite sides of the template, so that the holder can be introduced into one or the other recess of the template, depending on the rotational switching position of the receiver. If then, during the start of winding of a coil connected with the previously wound one, the clamping point of the wire is located on the circumference of the smallest template stage and the wire is aligned with a slit in the receiver containing the previously wound coil, no inter-pole connection results at the transition between the coils which would be visible at the end turns, instead, only turns in accordance with the size of the coils are found.

The templates are comparatively small, in particular with high-polar motors or generators. So that the recess in the template can also be as small as possible or that the holder can be introduced into a narrow separating gap, the holder suitably has two essentially perpendicularly arranged bolts as clamping levers. Then the recesses in the template only need to be large enough to receive the relatively small cross section of a bolt. If it is located inside the recess and the other bolt outside thereof, the clamping point between the two bolts is located just on the circumference of the template and the wire clamped between the bolts extends along its circumference. The seating of the bolts can be underneath the template so that it is only required to take the cross section of the bolts into account when choosing the size of the recesses.

A further object of the invention is to eliminate the danger of the wire being pulled back out of the already wound coil when an end length is drawn which projects away from the last continuously wound coil. With this it is attempted to achieve that drawing of the end length can still be performed after the last coil has been stripped off the template.

The last named object is attained in accordance with the invention in that for creating a defined length of the end section the wire is clamped at a point between the wire guide (flyer) and the template, is loosely grasped in the clamped state between this first clamping point and the wire guide, is pulled away from the wire guide and the clamping point, is cut in the drawn out area at a defined distance from the first clamping point and is clamped at a second clamping point between the cutting point and the wire guide.

Because in this novel method the length of wire needed for the end section is pulled out between the flyer and a clamping point, the holder clamping the wire absorbs the tensile load generated when the wire is pulled out. The tensile load can therefore not act on the last-wound coil and pull out wire therefrom.

The device proposed for executing the last mentioned novel method has the feature that the holder and the clamping and cutting device cooperate with a gripper by means of which, in the clamped state of the holder, the wire can be loosely grasped between it and the wire guide (flyer) and pulled out toward the clamping and cutting device. The holder preferably, but not necessarily, is one which is also used for the length pulling of inter-pole connections and/or for producing inter-pole connections of zero length. However, there is also the somewhat more elaborate option to provide, besides a length pulling device of the conventional type or one with a holder which can be introduced into a recess in the template, a separate clamping and cutting device which creates a free end section projecting away from the last wound coil and cuts the wire behind it and which has a holder independent of the length pulling device, a gripper and a further clamping device.

In the preferred embodiment of the invention the gripper is constituted by a roller which grasps the wire between the flyer and the holder and presses it on the one side of the roller against a cutting edge and immediately thereafter on the other side of the roller against a clamping block. The clamping block suitably is of sufficient length and is corrugated, so that after cutting the wire at the cutting edge the roller can roll it off on the corrugated clamping block completely up to the cut end and in this way create an entirely straight wire end which is corrugated to its extreme end. Up to now the wire was only corrugated between two clamping cheeks at the clamping point and its extreme end was not corrugated and was bent. The corrugation of the front wire end of a coil is used for identification when making electrical connections.

An exemplary embodiment of the invention will be explained in detail below by means of the attached drawings.

DETAILED DESCRIPTION OF THE PREFERRED EMBODIMENT

Figure 1:
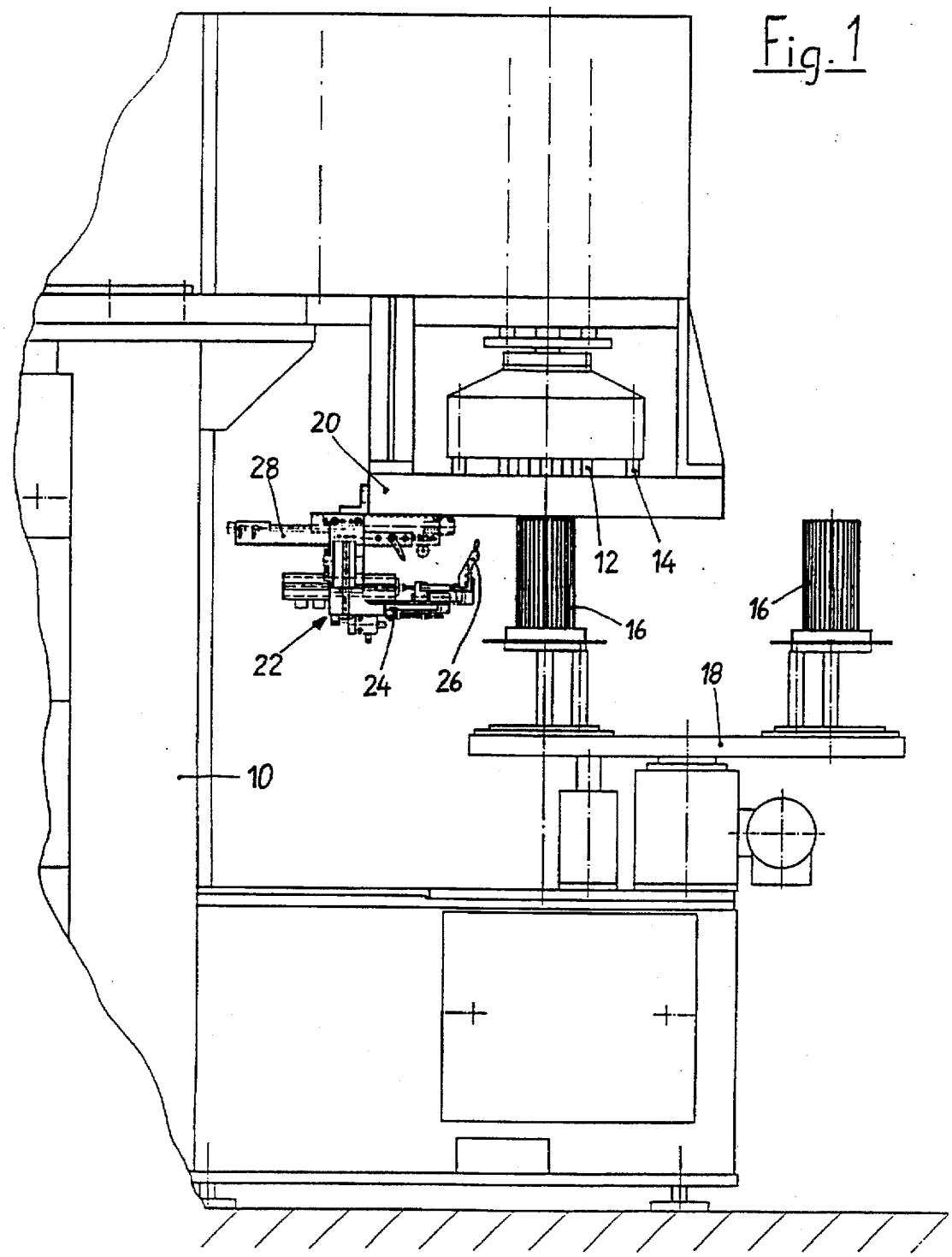
FIG. 1 is a lateral view of a winding device with a combined length pulling, cutting and clamping device fixedly attached to the machine frame.

The winding device for coils for electrical machines illustrated in FIG. 1 is of a design which basically has been known for a long time. A template 12, whose free end points downward, is fastened fixed against relative rotation on a machine frame 10. A wire guide 14, hereinafter identified as flyer in the customary manner, rotates around the template. This is a guide nozzle through which wire is pulled off a supply roll, not shown. The wire issuing from the nozzle is wound around the template 12 and forms a coil on its circumference or, in the case of a template consisting of several stages or chambers, a coil group. After a coil or coil group with a defined number of turns has been created in this way on the template, it is stripped off toward the bottom from the template by strippers, not shown, which can be moved in the vertical direction.

A receiver 16 is disposed below the template 12, which consists of a ring of rods and can rotated stepwise around the perpendicular central longitudinal axis. The turns of the coil fall into the slits between the rods of the receiver 16 which are provided for them. In part this can already take place during the winding process.

Every time a coil or coil group has been completely stripped from the template 12 into the receiver 16, the latter is turned further in steps, and a fresh coil or coil group is wound on the template and stripped off onto the receiver 16 in a different position on its circumference. After the intended number of coils has been created in this way and has been transferred to the receiver 16, it is moved from the position underneath the template 12, for example by a turntable 18, and taken to an inserting station or inserting device where the coils are drawn in a known manner directly from the receiver 16 axially into the grooves of a stacked stator lamination bundle (or a rotor lamination bundle of a so-called external rotor motor), if the receiver 16 is an inserting tool. If it is a transfer holder instead, the coils are first transferred from it to a inserting tool, from where they are then axially drawn into the grooves of a stator lamination bundle. As soon as a receiver 16 loaded with coils has moved away from under the template 12, the turntable immediately moves an empty receiver 16 under the template 12 and the above described operation is repeated.

A ring-shaped frame element 20 is part of the machine frame 10 and encloses the template 12 and the flyer 14, and a length pulling, clamping and cutting device identified as a whole by 22 is fastened on it. It consists of a lower, controlled part 24, movable in three dimensions, which is comparable to a length pulling device as used up to now, and which has a holder 26 on its front end which, depending on the closing position, can loosely enclose the wire placed into it and in the process can guide and clamp it. An upper part of the device 22, identified by 28, contains a clamping and cutting device as well as gripper. These parts will be individually explained in detail later.

Figure 2:
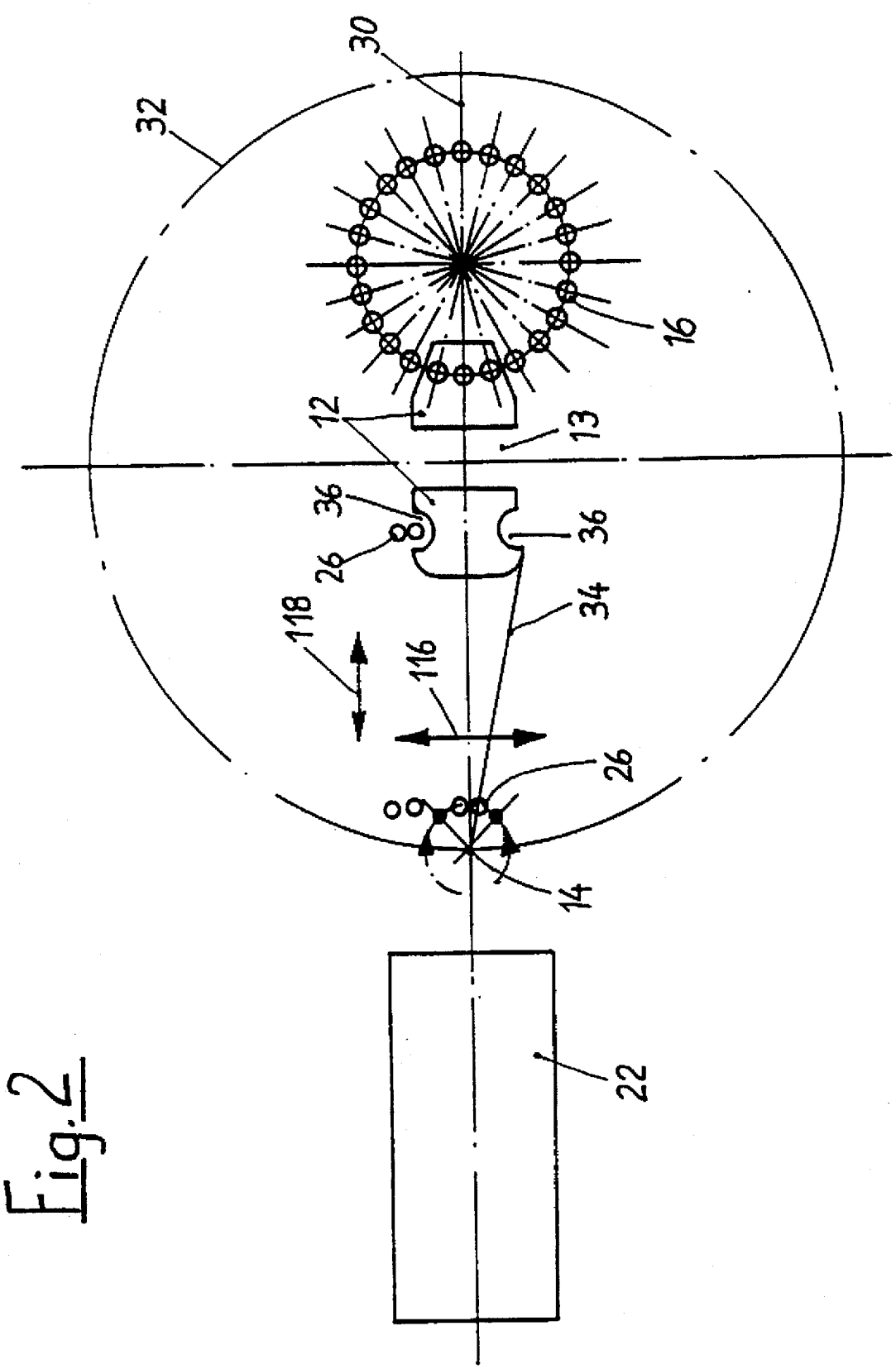
FIG. 2 is a schematic horizontal cross section through the winding device of FIG. 1, which shows the position of the holder of the length pulling, clamping and cutting device in relation to the template and the receiver.

FIG. 2 shows the position of the template 12, the receiver 16 and the holder 26 in a perpendicular projection. The template 12 is longitudinally divided by a perpendicular separating gap 13, so that a front and a rear template half result. The front template half overlaps the receiver 16 and is in engagement with it during the winding and stripping operation. The rear template half can be adjusted to be spaced more or less apart from the front template half by a horizontal movement along the center line 30 represented in FIG. 2 for the purpose of creating coils for stators with the same sheet-steel lamination, but different bundle height.

As shown in FIG. 2, the coil turns stripped of the template 12 fall into two slits of the receiver 16 which are separated from each other by three rods of the receiver 16. Let it be assumed in connection with FIG. 2 that in the course of winding the coil the flyer 14 has moved clockwise on the circular path 32 indicated by a dash-dotted line. After this first winding process the flyer 14 then was stopped on the center line 30, drawn through the centers of the template 12 and the receiver 16, on the side of the template 12 located opposite the receiver 16 in the position shown in FIG. 2. In this position the wire identified by 34 extends from the flyer 14 to the lower rear edge of the rear part of the template 12 which is divided transversely in relation to the center line 30 in the view of FIG. 2. Let it further be assumed that, following stripping of the first wound coil off the template 12 into the receiver 16, the latter is also turned clockwise by an angle corresponding to the circumferential distance of three slits in the receiver 16. The receiver slit which had been aligned with the lower surface of the template 12 as seen in FIG. 2 is now in alignment with the upper surface of the front part of the template.

At the termination of the winding operation the holder 26, in the opened position, takes up a position on the center line 30 near the flyer 14 between it and the template 12. The wire 34 is introduced into the holder 26 by means of an appropriate axial movement between the flyer 14 and the holder 26, which then closes to form a guide position loosely enclosing the wire. Following the complete stripping of the wire off the template, the holder 26 is taken along in the same direction of rotation, i.e. making reference to FIG. 2, starting with the position on the center line 30 upward and to the right, during indexing of the receiver 16. In addition, the holder 26 is guided to the side of the rear part of the template 12 which is located at the top in FIG. 2. There a recess 36 is cut in the template 12, into which the holder 26 can be introduced far enough so that the wire guided in the holder 26 is located on the circumferential surface of the template or directly below it and aligned with it. The wire is clamped in this position by the holder 26. Following indexing of the receiver 16, it now extends from the clamping point in the holder 26 along the upper part in FIG. 2 of the template 12 to the coil which now, in the representation of FIG. 2, hangs in the receiver 16 above the template 12. As can be seen from FIG. 2, it would be possible to introduce the holder 26 into the separating gap 13 instead of into the recess 36.

Winding of the next coil then follows, wherein the flyer 14 rotates counterclockwise. Since at the beginning of this winding process the wire had been maintained clamped directly on the circumferential surface of the template 12, the first wire turn of this coil is of no greater length than the turns subsequently created on the template 12 and, since at the end of the winding process, these are introduced into the same receiver slit which already holds the first coil and which is located at the upper surface of the front part of the template 12 in FIG. 2 during winding, an inter-pole connection of zero length results after the coils have been drawn into a stator lamination bundle, i.e. the connection does not appear as an excess length in comparison with the remaining coil turns and end turns.

The rear part of the template 12 in accordance with FIG. 2 preferably has two recesses 36 located opposite each other in relation to the center line 30, so that, depending on the rotational indexing position of the receiver 16, starting from the initial position next to the flyer 14 stopped on the center line 30, the holder 26 can be introduced into one or the other of the two recesses 36.

Figure 3:
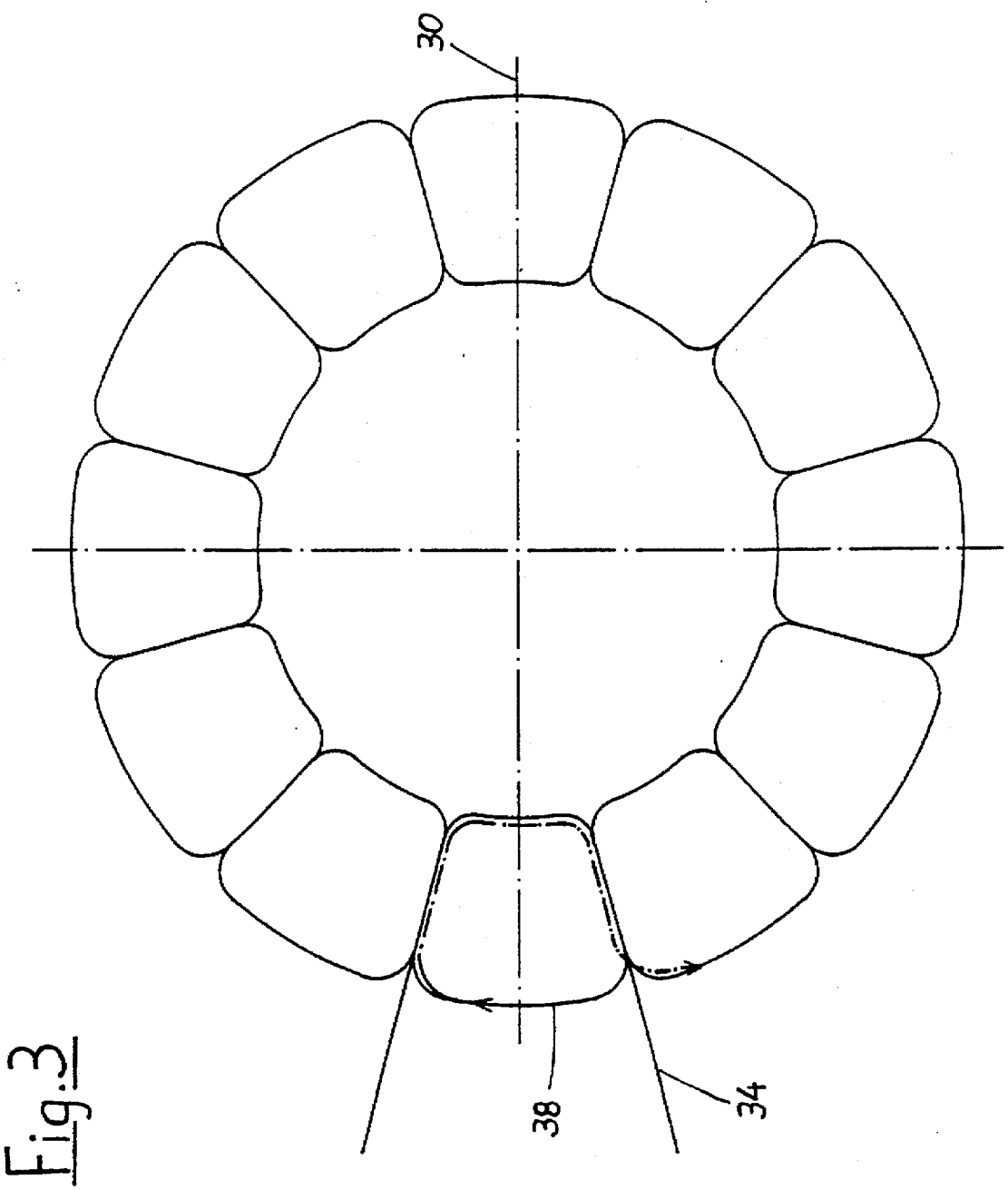
FIG. 3 is a top view of a coil layer of a multi-pole coil in which the inter-pole connections have zero length.

The arrangement of coils in the receiver 16 illustrated in FIG. 3 is created in this way. However, let it be assumed that following the first winding operation only the clockwise-wound coil 38, shown left of the center line 30, was created. Following indexing of the receiver 16 by the circumferential angle of one coil division, the wire of the last coil turn of the first coil, indicated by dash-dotted lines in FIG. 3, makes a direct transition into the first turn of the next coil when the latter is wound by means of an opposite direction of rotation of the flyer 14, so that the inter-pole connection between the two coils has zero length. This result can only be achieved if, as shown in FIG. 2, the wire is held clamped directly on the circumferential surface of the template 12 when the winding process for the second and every subsequent coil is started.

It should be understood that the device 22 with the controllably guided movable holder 26 which, depending on the situation at the moment, can guide the wire 34 by loosely enclosing it or can clamp it, can also create inter-pole connections of a quite defined length, depending on the winding operation to be performed, in that, following winding of one coil, defined movements are performed in relation to the flyer and the template and the wire is then clamped at a defined point which does not lie on the circumference of the template. In the process it is also possible to use a movement of the flyer to assist in pulling the wire back through the holder, which is kept in a loose guide position. The embodiment of the holder 26 used for clamping the wire in such a way that a half-closed position is also possible, wherein the wire is only loosely enclosed and guided so that it can slide through the holder, is known in principle. However, the holder 26 of the device described here has the special feature that its part which guides and clamps the wire consists of two essentially vertically extending bolts 40 (see FIGS. 4 and 5) which have a relatively small cross section in the horizontal cross-sectional area in which the wire 34 is clamped, so that the recesses 36 in the template 12, into which respectively only one of the two bolts 40 must be introduced, can be correspondingly small. The seating of the bolts 40, which has a larger horizontal cross section, remains below the template 12. It should also be noted in the course of fastening the device 22 on the center line 30 in accordance with FIG. 2 and the alignment of the clamping gap between the bolts 40 of the holder 26 parallel with the center line 30 in the clamping position, that, at the start of winding, the clamping gap is located aligned with the lateral surfaces of the template 12 extending parallel with the center line 30.

The holder 26 can advantageously be used not only for making inter-pole connections, if required of zero length, but also for creating a wire end section projecting away from the last coil after all connected coils have been wound. In the course of this the holder 26 cooperates with a gripper 42, a further clamping device 44 and a cutting edge 46, which are disposed in the upper part 28 of the device 22.

To be able to guide the holder 26 in three dimensions, three movable supports located in directions perpendicular to each other are provided. To distinguish between them, let the direction which in FIG. 4 extends from top to bottom be identified as the Z-direction, the direction extending from right to left as the Y-direction and the direction extending perpendicularly to the drawing plane as the X-direction. A support 48 displaceable in the Z-direction is connected with the piston rod 50, displaceable in the Z-direction, of a power cylinder identified as Z-cylinder 52 fastened on the machine frame 10, 20. Its path in the Z-direction is limited on both sides by means of stops 54 and 56, which are fixedly fastened on the machine frame 10, 20 and cooperate with adjustable stops 58 and 60 on the Z-support 48. The attainment of the end positions is reported to the control of the machine by proximity switches 62 and 64.

A power cylinder identified as X-cylinder 66, whose longitudinal central axis extends in the X-direction, is fastened on the Z-support 48. In addition, an X-support 70 connected with the piston rod of the X-cylinder 66 is displaceably guided in the X-direction one a guide 68 on the Z-support. One of the two stops limiting the movement of the X-support in both directions is shown at 72. The proximity switches being triggered when the X-support has reached the end positions are indicated at 74 and 76.

A Y-cylinder 78, whose longitudinal central axis extends in the Y-direction, is fastened on the X-support 70. In addition, a Y-support 80 is guided, displaceably in the Y-direction, on a guide of the X-support 70. On its right front end in FIG. 4 it supports the holder 26 and on the left a clamping cylinder 82, which operates the holder 26 via a piston rod 84. A fixed stop 86 disposed on the X-support 70 and an adjustable stop 90, also disposed on the X-support by means of a threaded rod 88, cooperate with a projection 92, which can be moved between these two stops 86 and 90 and is fixedly disposed on the Y-support 80, and limit the path of the Y-support 80 on both sides. In this case the adjustable stop 90 limits the movement of the holder 26 in the direction toward the receiver 16. The Y-direction coincides with the direction of the center line 30 in FIG. 2. Reaching of the end positions of the Y-support 80 is reported to the control device of the machine by two proximity switches 94 and 96.

Figure 4:
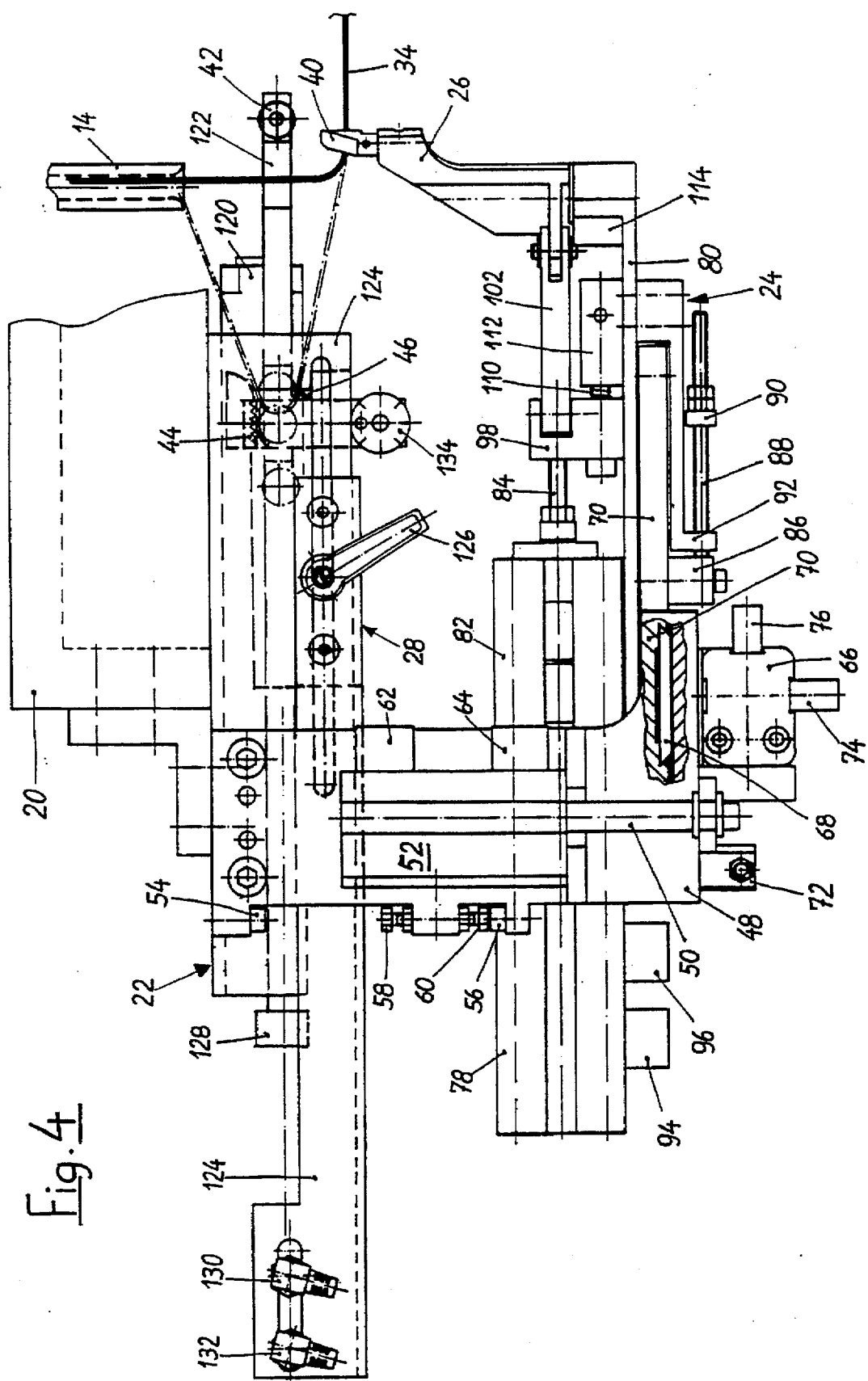
FIG. 4 is a lateral view on an enlarged scale of the length pulling, clamping and cutting device of the device of FIG. 1.
Figure 5:
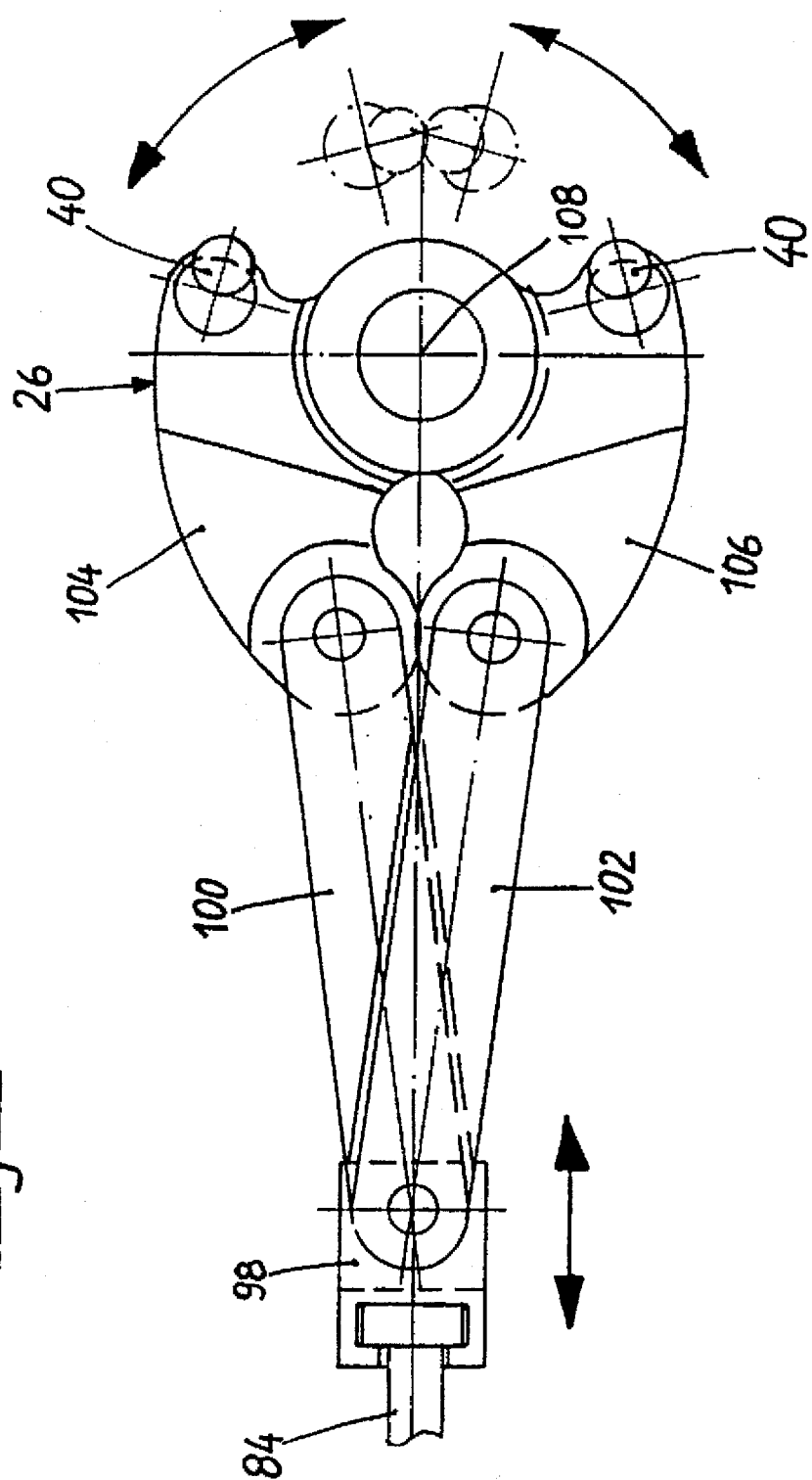
FIG. 5 is a top view of the clamping and guide holder of the length pulling, clamping and cutting device of FIG. 4.

The drive of the holder 26 can be seen in FIG. 5 in connection with FIG. 4. In accordance with this, the front end of the piston rod 84 is connected with a bearing body 98 which is displaceably guided along the Y-support 80 in the Y-direction and on which the rear ends of two push rods 100 and 102, which are arranged in opposition obliquely to the movement direction of the piston rod 84, are pivotably seated. The holder 26 consists of two essentially angular levers 104 and 106, which are rotatably seated on a common shaft 108 extending in the Z-direction, i.e. vertically. The latter crosses the extension of the longitudinal central axis of the piston rod 84. The obliquely disposed push rods 100 and 102 are pivotably connected to the rear ends of the horizontal legs of the angular levers 104 and 106. The upper ends of the essentially vertically extending legs of the angular levers 104 and 106 support the bolts 40, which are brought together out of the opened state of the holder 26, shown in solid lines in FIG. 5, into the clamping position shown by dash-dotted lines when the levers 104 and 106 are displaced to the right in FIG. 5 in relation to the shaft 108 fixedly disposed on the Y-support by the piston rod 84 via the push rods 100 and 102, and in the process are pivoted around the shaft 108.

A stop element 112 is connected with the bearing body 98 via a spring 110 and is movable within narrow limits in the Y-direction. The fixed clamping position of the bolts 40 is attained after the stop element 112 has been pushed against a stop 114 fixedly disposed on the Y-support, and the spring 110 has been compressed, so that now the stop element 112 limits the further movement of the bearing body 98 toward the right in FIG. 4. In this position of the parts, the bolts 40 clamp the wire 34 between them. If now the pressure in the clamping cylinder 92 is reduced again by a defined value, first the spring 110, which is supported on the stop 114 via the stop element 112, pushes the bearing body 98 to the left within narrow limits, because of which the distance between the two bolts is slightly increased in such a way that they no longer clamp the wire 34 in place, but only loosely guide it in the jaws of the holder (not shown) so that, although the wire cannot be pulled out of the jaws toward the top, it can slide in the jaws.

It follows from the above description that the holder 26 can be moved in the vertical direction, i.e. from below to above toward the wire outlet nozzle of the flyer 14 and back, by the movement of the Z-support 48. A movement of the holder 26 in the direction of the two-headed arrow 116 in FIG. 2 transversely to the center line 30 takes place by the displacement of the X-support 70, and the holder 26 is moved parallel to the center line 30 in accordance with the two-headed arrow 118 in FIG. 2 by the displacement of the Y-support 80. The described three-dimensional drive of the holder 26 can be further complemented in that a rotating drive for the controlled turning of the Z-support 48 is provided in accordance with FIG. 6.

The upper part 28 of the device 22 consists of a power cylinder 120 fixedly attached to the machine frame 10, 20, whose piston rod extends in the Y-direction, and which is connected at a projection 128 with an equally oriented rod 122 which supports on its right front end in FIG. 4 a roller, rotatable around a horizontal transverse axis, to form the gripper 42. As can be seen from FIG. 4, the roller 42 can be moved out toward the right past the flyer 14 and the holder 26 when the flyer 14 is in the position illustrated in FIG. 2 and the Y-support 80 has been retracted into its left end position.

The left end position of the gripper 42 is adjustable. For this purpose the upper part 28 of the device 22 has an elongated support element 124 which, guided in respect to the machine frame 10, 20, is adjustable in the Y-direction and can be fixed in place in the desired position by means of a clamping lever 126. The clamping block 44 and the cutting edge 46 are fixedly disposed on the support element 124 near its right end. The distance of the clamping block 44 and the cutting edge 46 from the flyer 14 is selectably increased or decreased by adjusting the support element 124. In this way it is possible to set the desired length of the wire end sections respectively to be produced, which project away from the coils. Two proximity switches 130 and 132 are located at the left end of the support element 124 and cooperate with the projection 128 on the rod 122, the first of which actuates the control device when the roller constituting the gripper 42 has been moved toward the left so that the wire 34 pulled along by the roller 42, in the position shown by dash-dotted lines in FIG. 4, has been cut in its lower strand extending from the roller to the holder 26 at the cutting edge 46 by means of the roller, and the strand extending from the flyer to the roller 42 has been clamped between the roller and the clamping block 44. The second proximity switch 132 is actuated and causes the termination of the displacement of the rod 122 toward the left after the roller 42, on its way toward the left, has moved past the clamping block 44, so that the wire end which extended between the clamping block 44 and the flyer 14 following the cutting of the wire at the cutting edge 46 is released.

As indicated in FIG. 4, the clamping surface of the clamping block 44 is corrugated. When in the course of the movement of the rod 122 toward the left the roller 42 moves past the clamping block 44, it causes two actions: first, the outer free end of the wire section leading to the flyer 14, which was bent around the roller 42 at the moment of cutting, is straightened. Secondly, the corrugation of the clamping block 44 is transferred to the last end of the wire section leading to the flyer 14, so that the corrugation of the straightened wire end can be felt by the fingertips. The clamping effect and the depth of the corrugation in the wire can be adjusted by means of a fine setting of the height of the clamping block 44 in respect to the horizontal path of the roller 42. The adjustment in the example is performed by means of a rotatably adjusting disk 134 via screw threads and wedge faces.

When it is intended to cut the wire after winding of a set number of connected coils and the receiver 16 loaded with coils is to be removed from the template 12, the flyer 14 stops in front of the device 22 on the center line 30 in the position shown in FIG. 2. With the Y-support 80 retracted completely to the left, the holder 26 in the wide open state is located on the center line 30 slightly to the right of the flyer 14. The roller of the gripper 42 is also located on the center line 30 to the right of the flyer 14. If now, during the stripping of the last coil turns off the template 12, the flyer 14, together with the known strippers, not shown, moves downward along the template 12, it introduces the wire 34 between the bolts 40, i.e. into the opened holder 26, which thereafter is closed. The arrangement can also be made in the reverse manner in such a way that the flyer 14 remains on its level and the holder 26 is lifted by actuating the Z-cylinder 42 far enough so that it can grip the wire 34 next to the flyer 14 by means of the bolts 40 moving along the piston rod 122 and the roller 42 in the course of lifting and clamp it. After clamping of the wire 34 the flyer 14 or the holder 26 move apart again in the vertical direction, so that the vertical distance between them shown in FIG. 4 results, wherein the gripper 42 is located on a level between them.

Grasping and clamping of the wire 34 by means of the holder 26 in the above described manner on the center line 30 also takes place if, at the transition between one coil to the next coil to be continuously wound, the wire is to be only temporarily clamped and to be guided to form an inter-pole connection, such as described in detail above in connection with FIG. 2. Only in this case is the gripper 42 not moved toward the right past the flyer 14.

If, in connection with the production of wire end sections of a defined length, the function of the device is further examined in the course of cutting the wire, the retraction of the gripper 42 toward the left follows in the next step. In the process its roller grasps the wire 34 approximately halfway between the clamping point in the holder 26 and the outlet opening of the flyer 14. The wire is pulled into the loop with an upper and a lower strand shown in FIG. 4. This results in the advantage that pulling out the wire loop cannot have any effect on the last wound coil because the wire is clamped in the holder 26. Thus it is not possible to pull wire back out of the last wound coil, i.e. drawing out the end sections by means of the gripper 42 can take place simultaneously with or following the stripping of the last wound coil off the template, so that the cycle time of the production can be shortened.

The clamping block 44 is disposed in respect to the cutting edge 46 in such a way that in the course of retracting the gripper 42 toward the left, first the wire is cut through at the cutting edge 46 before it is clamped between the roller and the clamping block 44. Immediately following this, the power cylinder 120 stops the gripper 42 and the holder 26 is opened. The wire end connected with the last wound coil is practically not bent at the cutting point because at the moment of cutting it extends essentially straight between the holder 26 and the cutting edge 46. This wire end is also not corrugated next to the cut point, thus it can be recognized by its smooth appearance as the rear end of the continuously wound coils. The latter are removed from the template 12, together with the receiver 16 holding them, following the opening of the holder 26.

During this time the wire section extending from the flyer 14 to the clamping block 44 still remains clamped between the roller of the gripper 42 and the corrugated clamping block 44. Only after a fresh empty receiver 16 has been placed under the template 12 and the flyer 14 has created the first turns of a fresh coil on the template 12 is the gripper 42 pulled back into its left end position, in the course of which the clampingly held outer wire end is straightened and corrugated on the clamping block by the roller of the gripper 42. The front end section of the coils can later be recognized because of this corrugation.

It is easily understood that the shape of the holder 26 is unimportant in connection with the last described function of forming wire end sections. It is only important that a holder which keeps the wire clamped is present at all between a gripper 42 pulling out the wire and the last wound coil, so that no wire can be pulled out of the coil. The device described in connection with FIG. 4 can therefore also be realized by means of a holder 26 which, unlike the one in connection with FIG. 2, cannot be partially introduced into a recess in the template 12. Therefore holders 26 such as have been employed up to now can also be used for making the inter-pole connections of defined lengths.

It is furthermore understood that the same function can be achieved, although in a more involved manner, when the gripper 42 with its roller in cooperation with the clamping block 44 is not a part of a clamping device nor is part of a cutting device in cooperation with the cutting edge 46. For example, the arrangement can be such that one gripper takes the wire to a knife- or scissors-like cutting device which cuts it through, and then continuous to take it to a clamping device consisting of two clamping jaws.

Figure 6:
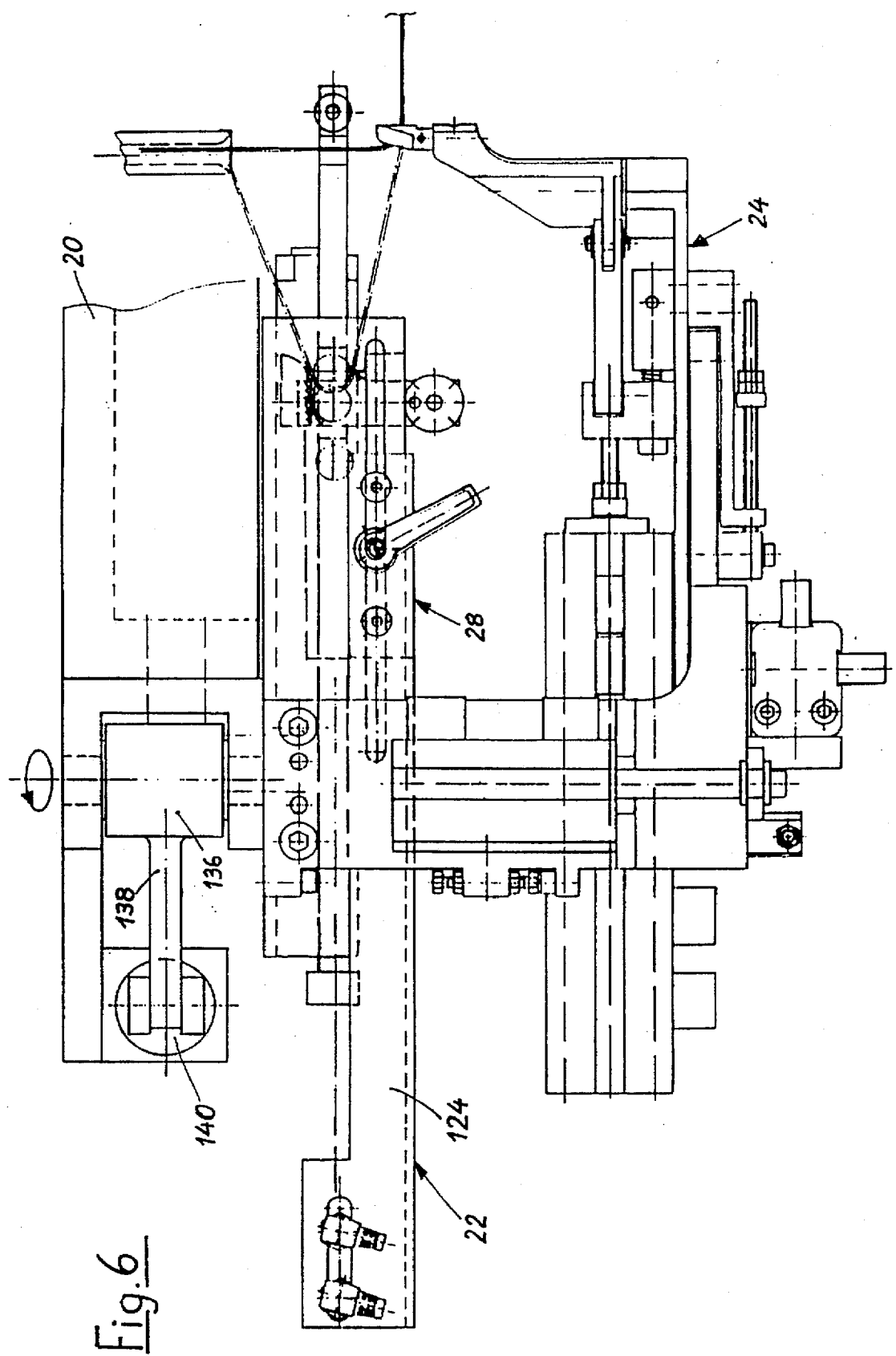
FIG. 6 is a variant exemplary embodiment in a view corresponding to FIG. 4.

The embodiment represented in FIG. 6 differs from the one of FIGS. 1 to 4 only in that the entire device 22 is rotatably seated on a vertical shaft on the machine frame 10, 20. For this purpose that part of the device 22 on which the support element 124 is seated and on which it can be fastened by means of a clamping lever 126 is connected with a support element 136 which is rotatably seated on the machine frame 10, 20. The element is provided with a radially projecting arm 138, whose free end is acted upon by a power cylinder 140 seated on the machine frame 10, 20. When this power cylinder 140 is actuated, the entire device 22 is therefore pivoted by a defined angle around the vertical axis of rotation of the support element 124. It is possible to create especially long wire end sections by means of this pivot movement which is added to the linear movement of the gripper 42.

In a further variant of the last described embodiment it can also be provided that only the upper part 28 of the device 22 is pivoted by means of the rotary drive 136 to 140, while the lower part 24 only performs the triaxial movements described in connection with FIG. 4. In this case the gripper 42 is pivoted in relation to the wire guide 14 as well as relative to the holder 26. The pivot movement can therefore take place with the holder clamped and held in place after the coils have been stripped off the template into the receiver.

Finally, it should also be pointed out that the device 22 with the upper part 28 and the lower part 24 does not necessarily have to be fastened by means of a frame element 20 disposed at the top of the machine frame. At least the lower part 24 of the device 22 could be seated on the lower part of the machine frame which supports the receiver 16 or the turntable 18.

What is claimed is:

1. A method of winding coils comprising conductor wire for electric motors and generators, the method comprising the steps of:

creating a first coil or group of coils on a template by means of a circulating wire guide;

stripping the first coil or group of coils off the template into a receiver having circularly disposed slits;

grasping the wire by a holder between the wire guide and the template after said step of creating or during said step of stripping;

indexing the receiver by a rotating movement;

clamping the wire in the holder and temporarily holding it radially outside of the receiver while starting winding of the next coil or group of coils;

repeating said steps of creating, stripping, grasping, indexing and clamping to form additional sequential coils or groups of coils until creation of a last continuously wound coil; and creating a defined length of an end section of the wire by clamping the wire at a first clamping point between the wire guide and the template, loosely grasping the wire between the first clamping point and the wire guide, pulling the end section away from the wire guide and the first clamping point, cutting through the end section of the wire at a defined distance from the first clamping point and clamping the wire between the cutting point and the wire guide to form a second clamping point, such that the wire has a defined end length projecting away from the last continuously wound coil.

2. The method according to claim 1 wherein the step of clamping while starting winding comprises clampingly holding the wire substantially on a circumference of the template.

3. The method according to claim 2 wherein, after termination of winding of the first coil or group of coils, the wire is loosely grasped at a point which when viewed axially is located substantially between the wire guide in a stopped position and a longitudinal central axis of the template, and subsequently, depending on direction of the rotating movement of the coil or coil group hanging in the receiver, the point were the wire is loosely grasped is moved with the same directional component to a point on the circumference of the template where the wire is clampingly held.

4. The method according to claim 1 wherein the first clamping point is located substantially on a connecting line between the wire guide in a stopped position after a last winding operation and a longitudinal central axis of the template, the wire being pulled out radially in relation to the longitudinal central axis.

5. The method according to claim 1 further comprising the step of stretching the wire between the second clamping point and the cutting point and corrugating the wire during the step of stretching.

6. A device for executing the method according to claim 1, the device comprising:

a wire guide which can be driven to move around a template to create coils from a wire;

a receiver having circularly arranged slits and being axially engagable with the template in several angles of rotation for stripping the coils off the template;

a movably disposed holder seated at a radial distance from the template for selectively loosely grasping or clamping the wire at defined points between the wire guide and the template;

a device for clamping and cutting the wire after several connected coils or coil groups have been wound; and a gripper cooperating with the holder and the clamping and cutting device for loosely grasping the wire between the holder when in a clamped state and the wire guide and pulling out the wire in a direction toward the clamping and cutting device.

7. The device according to claim 6 wherein the holder is radially introducible from the outside into at least one recess or a separating gap of the template sufficiently far so that the wire can be clamped substantially on a circumference of the template.

8. The device according to claim 7 wherein the template is divided along a length thereof into two template parts adjustable in a longitudinal central plane at a variable distance from each other, the wire guide being stoppable substantially in the longitudinal central plane of the template and the receiver between winding of two connected coils or coil groups, the wire being introducible into the holder by means of a relative axial movement between the wire guide and holder when the holder is maintained substantially in the longitudinal central plane, the wire being selectively introducible into one of two recesses disposed on opposite sides of the template in relation to the longitudinal central plane or introducible into the separating gap when the holder is in a state in which the wire is loosely enclosed.

9. The device according to claim 7 wherein the holder, from an upper free end to at least a horizontal transverse plane in which it guides or clamps the wire, comprises only bolts of small diameter.

10. The device according to claim 6 wherein, during pulling out, cutting and clamping of the wire, the holder, the gripper and the clamping and cutting device are arranged substantially in a common vertical linear central plane of the template and the receiver in such a way that the clamping and cutting device is disposed above and, in relation to the longitudinal central axis of the template, outside of the holder.

11. The device according to claim 6 wherein distance between the holder and the clamping and cutting device is adjustable.

12. The device according to claim 6 wherein the gripper includes a roller having a horizontal axis of rotation and is displaceable in relation to the longitudinal central axis of the template in a direction radially from the inside to the outside against the wire extending downward from the wire guide toward the holder, and continuing, while forming a wire loop comprising an upper and a lower strand, to a cutting edge and a clamping block, the upper strand being clamped between the clamping block and the roller after the lower strand has been pushed against the cutting edge by the roller and has been cut through.

13. The device according to claim 12 wherein the clamping block includes a corrugated surface and the roller of the gripper is outwardly displaceable past a position required for cutting the wire to a position in which the roller rolls off on the wire end, the clamping block impressing its corrugation on the wire end during displacement of the roller, the wire end being stretched to a substantially straight orientation on the clamping block.

14. The device according to claim 12 wherein distance between the roller of the gripper and the clamping block in the clamping position is adjustable.

* * * * *